Patented Aug. 31, 1954

2,687,970

UNITED STATES PATENT OFFICE 2,687,970

PLASTICIZED CELLULOSE ESTER COMPOSITION

John D. Brandner and Robert H. Hunter, Wilmington, Del., assignors to Atlas Powder Company, Wilmington, Del., a corporation of Delaware No Drawing. Application August 29, 1950,
Serial No. 182,122

4 Claims. (Cl. 106—179)

This invention relates to plasticized compositions of cellulose acetate-butyrate and of cellulose propionate.

An object is to provide novel plasticized compositions of cellulose acetate-butyrate and of cellulose propionate.

It is a further object to provide cellulose acetate-butyrate compositions particularly suited for injection and compression molding.

A still further object is to provide cellulose acetate-butyrate compositions modified with plasticizers of high solvency for and compatibility with the said ester and of low volatility, which compositions mill well and, upon molding, yield products of high impact strength, low water absorption and high heat stability.

The above and other objects will become apparent in the course of the following description and the appended claims.

The novel plasticizers of the invention are lauric acid esters of aryloxy alkanols and conform to the generic formula

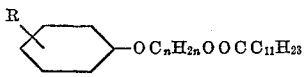

wherein R represents hydrogen or the methyl radical, and $n$ is a whole number from 2 to 3. The compounds so represented are laurates of phenoxyethanol, phenoxypropanol, cresoxyethanol and cresoxypropanol.

Plasticized compositions of the present invention contain a cellulose ester component and, as a plasticizer therefor, a compound conforming to the above formula. The cellulose ester component is selected from the group consisting of cellulose propionate containing from 0.2 to 0.5 free hydroxyl groups per anhydro glucose unit; and cellulose acetate-butyrate of from 5% to 20% acetyl content, from 25% to 50% butyryl content and from 0.2 to 0.5 hydroxyl groups per anhydro glucose unit. The preferred cellulose ester for use in the preparation of compositions according to the invention is cellulose acetate-butyrate of approximately 13% acetyl and 37% butyryl content, with a viscosity of 17 to 33 seconds by ASTM method D871–46T.

The proportion of cellulose ester to plasticizer in the compositions will vary with the nature of the ester, the plasticizer and the use for which the composition is intended, as is well understood in the art. In general, however, the compositions should contain not less than about 5% nor more than about 25% plasticizer based on the sum of the weights of cellulose ester and plasticizer to produce compositions of utility for injection and compression molding. With the preferred cellulose acetate-butyrate ester disclosed hereinbefore it is preferred to use from 10% to 15% by weight of the preferred plasticizers.

The plasticized compositions of the present invention comprise mixtures of the named plasticizer with the named cellulose esters. Alternatively there may be present coloring matter such as dyes or pigments, and inert fillers added in the known way to modify the properties of fabricated plastic articles molded therefrom. The said compositions may comprise mechanical mixtures of the liquid plasticizers uniformly distributed throughout and absorbed by granular or powdered cellulose esters, or molded shapes formed by compression or injection molding of such mixtures at elevated temperatures, or sheets formed by incorporating the said plasticizer with the cellulose ester on a roll mill, or chips formed by flaking sheets from such a mill. Films and sheets of the plasticized cellulose esters of the invention may likewise be prepared by dissolving the ester and plasticizer in suitable solvents and casting films from the solution, or applying the solution to a surface to be coated, in the manner well known in the art. The preferred method of preparing the plasticized compositions is by incorporation on a mill. The required conditions will, of course, vary somewhat with the percentage of plasticizer, the nature of the ester and the effect of modifying pigments or fillers but in general it is sufficient to mill the premixed ingredients at 280° F. to 320° F. for 10 to 20 minutes.

The aryloxyalkanol ester plasticizers of the present invention may be prepared by direct esterification of the appropriate ether-alcohol and fatty acid. Preferably the esterification is carried out in the absence of a catalyst and in the presence of a considerable excess, usually about 50% of the said ether-alcohol. The reaction mixture is heated in an inert atmosphere of from 200° to 240° C., until the acid number reaches a value less than about 10. When the reacting ether-alcohol is phenoxy- or cresoxy-propanol the higher part of the indicated temperature range is preferably employed, whereas with the more reactive ether-ethanols it is preferred to maintain the temperature at about 220° C. The excess aryloxyalkanol is then removed by vacuum distillation. It has been found that, at a pressure of 10 mm., the free hydroxyl content can be reduced to a vanishingly small value in about 2 hours at 210° to 220° C., if the charge is well agitated. Optionally, the esterification and vacuum stripping may be carried out in the presence of a small amount, such as 1% on the total charge, of a decolorizing carbon to produce plasticizers of improved color. In such cases the carbon is filtered from the plasticizer after the excess ether-alcohol has been distilled and the charge cooled to below about 100° C.

The following specific examples illustrate the preparation of the novel plasticizers of the invention.

Example I 600 grams of phenoxy ethanol, 600 grams of lauric acid, and 12 grams of activated carbon were charged into a reaction vessel provided with an agitator and means for maintenance of an inert atmosphere over the charge. The charge was heated to 220° C. and held at that temperature until the acid number was 5. This required approximately 5 hours at temperature. The reaction mixture was cooled to 110° C. and a vacuum of 1 mm. applied. The temperature of the charge was slowly increased as the excess phenoxy ethanol distilled out. After 1.5 hours the charge temperature was 180° C. and ester was distilling from the vessel. Heating was discontinued, the charge cooled to below 100° C. and filtered to separate the activated carbon. The resulting product had an acid number of 0.05 and hydroxyl value of 1.0 indicating the almost complete absence of unreacted components. The saponification value was 179 which compares favorably with the theoretical value for phenoxyethyl laurate which is 175. The ester so prepared was an oily liquid of light color, solidifying at temperatures below about 22° C. Its refractive index was 1.4829.

The fatty acid obtainable by hydrolysis of coconut oil, and known in the oil arts as COFA, is rich in lauric acid, containing in addition thereto substantial quantities of shorter and longer chain fatty acids, particularly capric and caprylic acids. This mixture of acids is the full equivalent of lauric acid for the purposes of the present invention. Similarly, impure aryloxy-alkanols, such for example as those obtained by reacting slightly in excess of one mol of alkylene oxide with one mol of phenol or cresol may be employed as the esterifying alcohol. The following example shows the preparation of COFA ester of such an impure ether-alcohol.

Example II 37.5 pounds of COFA, 37.5 pounds of the commercial phenoxy-ethanol obtained by addition of 1.1 mols of ethylene oxide to 1.0 mol of phenol and 0.75 pound of activated carbon were heated together under agitation and in an inert atmosphere at 220–230° C. for 4 hours. The acid number of a sample removed at this point was 6.6. The charge was allowed to cool to 116° C. and vacuum applied. A vacuum of approximately 7 mm. was maintained while the temperature of the charge was raised to 220° C. over a period of 1.75 hours and held at that temperature for an additional hour. The charge was cooled to 100° C., the vacuum released with carbon dioxide and the product filtered. The resulting ester was a light colored oily liquid of saponification value 167, acid number 2.5 and hydroxyl number 2.5.

Example III 684 grams of phenoxy propanol, 600 grams of COFA and 13 grams of activated carbon were heated with agitation and in an inert atmosphere at 235° C. to 240° C. for 5 hours. The acid value was 6. The charge was cooled to 100° C. and a vacuum of 1 mm. applied. The temperature was raised slowly as the unreacted phenoxypropanol distilled off. After 1.5 hours and at a charge temperature of 160° C. ester was being distilled and the heating was discontinued. The resulting product was cooled to 70° C. and filtered. The resulting ester was an oily liquid of light color with an acid number of 6.9, hydroxyl number 2.3 and saponification value 169. The theoretical saponification value for this ester is 168.

Cresoxyethyl and cresoxypropyl esters of lauric acid and COFA are prepared in exactly analogous manner.

Examples showing the preparation of cellulose ester composition plasticized with the novel plasticizers of the invention are presented in the following:

Example IV

Ten parts of phenoxyethyl laurate were mixed with 90 parts of cellulose acetate-butyrate of approximately 37% butyryl, content, 13% acetyl content, and 20 seconds viscosity and the mixture compression molded at a temperature of 365° F. and approximately 7,000 pounds per square inch to form a disk 2¼ inches in diameter and approximately $\frac{3}{16}$ inches thick. The resulting disk had a very high impact strength, excellent resistance to water, good volatility characteristics and was light in color.

Example V

Ten parts of phenoxypropanol ester of coconut fatty acids were mixed with 90 parts of the cellulose acetate-butyrate described above and fed into a 2 roll mill preheated to 310° F. Milling was continued for 10 minutes to form a homogeneous translucent sheet of light color. There was almost no development of odor during the milling. Chips of the milled sheet were compression molded at 365° F. and approximately 7,000 pounds per square inch to form light colored, clear disks of high impact strength, low water sensitivity and low volatility.

Example VI 20 parts of phenoxyethyl COFA ester and 80 parts of cellulose propionate were milled for 10 minutes on a 2-roll mill at 315° to 320° F. A homogeneous translucent sheet of light color resulted. Chips of the sheet were compression molded at 400–410° F. and approximately 5,000 pounds per square inch pressure to form a disk of excellent clarity and very high impact strength.

A composition suitable for hot melt coating of metals may be prepared as follows:

Example VII

Intimately mix 25 parts by weight of phenoxyethyl COFA ester and 75 parts by weight of a cellulose acetate butyrate of 48% butyryl and 6.5% acetyl content. Melt the components together for application by dipping or knife coating at a temperature of 150° to 170° C.

A plasticized composition containing cresoxyethyl laurate may be prepared as follows:

Example VIII

Intimately mix 20 parts of cresoxyethyl laurate and 80 parts of granular cellulose propionate. Introduce the mixture into a mold and subject it to a temperature of 400° F. for 10 minutes at a pressure of 5000 pounds per square inch.

The above examples are illustrative only and

What is claimed is:

1. A plasticized cellulose ester composition consisting essentially of from 5 to 25% by weight of a lauric acid ester conforming to the generic formula

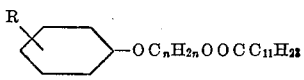

wherein R is selected from the group consisting of hydrogen and methyl and $n$ is a whole number from 2 to 3, and from 95 to 75% by weight of a cellulose ester selected from the group consisting of cellulose propionate containing from 0.2 to 0.5 free hydroxyl groups per anhydro glucose unit and cellulose acetate-butyrate of from 5% to 20% acetyl content and from 25% to 50% butyryl content and from 0.2 to 0.5 free hydroxyl groups per anhydro glucose unit.

2. A plasticized cellulose ester composition as in claim 1 wherein the cellulose ester is cellulose acetate-butyrate.

3. A composition consisting essentially of from 5% to 25% by weight of the phenoxyethyl ester of coconut oil fatty acids and from 95% to 75% by weight of cellulose acetate-butyrate of from 5% to 20% acetyl content, from 25% to 50% butyryl content, and from 0.2 to 0.5 hydroxyl groups per anhydro glucose unit.

4. A composition consisting essentially of from 10% to 15% by weight of the phenoxyethyl ester of coconut oil fatty acids and from 90% to 85% by weight of a cellulose acetate-butyrate of approximately 13% acetyl content, 37% butyryl content and 20 seconds viscosity.

References Cited in the file of this patent

UNITED STATES PATENTS

| Number | Name | Date |
|---|---|---|
| 1,676,612 | Kramer | July 10, 1928 |
| 2,098,190 | Kyrides | Nov. 2, 1937 |
| 2,102,825 | Woodhouse | Dec. 21, 1937 |
| 2,202,066 | Platt | May 28, 1940 |
| 2,372,980 | Piech | Apr. 3, 1945 |
| 2,506,904 | Smith | May 9, 1950 |